(12) United States Patent
Seder et al.

(10) Patent No.: US 10,101,506 B2
(45) Date of Patent: Oct. 16, 2018

(54) DISPLAY ASSEMBLY WITH DIFFUSING MEMBER FOR APPEARANCE MATCHING

(71) Applicant: GM GLOBAL TECHNOLOGY OPERATIONS LLC, Detroit, MI (US)

(72) Inventors: Thomas A. Seder, Warren, MI (US); James A. Carpenter, Rochester HIlls, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 15/186,594

(22) Filed: Jun. 20, 2016

(65) Prior Publication Data

US 2017/0363781 A1    Dec. 21, 2017

(51) Int. Cl.

| | |
|---|---|
| *G02F 1/1335* | (2006.01) |
| *G02B 5/02* | (2006.01) |
| *G02B 5/32* | (2006.01) |
| *G02F 1/1368* | (2006.01) |
| *G03H 1/02* | (2006.01) |
| *G02F 1/1333* | (2006.01) |

(52) U.S. Cl.
CPC ......... *G02B 5/0252* (2013.01); *G02B 5/0284* (2013.01); *G02B 5/32* (2013.01); *G02F 1/1368* (2013.01); *G02F 1/133504* (2013.01); *G02F 1/133514* (2013.01); *G02F 1/133528* (2013.01); *G02F 1/133603* (2013.01); *G03H 1/0244* (2013.01); *G02F 1/13338* (2013.01); *G02F 2001/133507* (2013.01); *G02F 2001/133562* (2013.01); *G02F 2001/133567* (2013.01); *G02F 2001/133614* (2013.01); *G02F 2202/36* (2013.01)

(58) Field of Classification Search
CPC ............... G02B 27/01; G02F 1/133504; G02F 2001/133562
USPC ..................................................... 349/11, 112
See application file for complete search history.

(56) References Cited

U.S. PATENT DOCUMENTS

| | | | | |
|---|---|---|---|---|
| 5,629,784 | A * | 5/1997 | Abileah | G02F 1/133504 349/112 |
| 2006/0001036 | A1* | 1/2006 | Jacob | G02B 6/0003 257/98 |
| 2007/0188022 | A1* | 8/2007 | Itabashi | G02B 27/0093 307/9.1 |
| 2008/0144179 | A1* | 6/2008 | Mimura | G02B 5/005 359/599 |

(Continued)

*Primary Examiner* — Wen-Ying P Chen

(57) ABSTRACT

A display unit includes a display region and a border region. The display region is configured to include a dark state. A diffusing member is positioned adjacent to the border region such that the diffusing member is coextensive with the border region. A first electromagnetic ray bundle incident on the display region in the dark state produces a first bidirectional reflection distribution function. A second electromagnetic ray bundle incident on the border region produces a second bidirectional reflection distribution function. The diffusing member is configured such that the first bidirectional reflection distribution function is substantially identical to the second bidirectional reflection distribution function. The diffusing member may include a base layer and a surface hologram recorded onto the base layer. The surface hologram is configured to encode a spatial pattern in at least one of the opacity, density, and surface height of the base layer.

15 Claims, 3 Drawing Sheets

(56) References Cited

U.S. PATENT DOCUMENTS

2010/0231560 A1* 9/2010 Toyooka .............. G09G 3/3648
345/205
2014/0168947 A1* 6/2014 Lin ..................... G09F 13/0413
362/97.1
2015/0167921 A1* 6/2015 Gollier ................. G02B 5/0263
362/326

* cited by examiner

DISPLAY ASSEMBLY WITH DIFFUSING MEMBER FOR APPEARANCE MATCHING

TECHNICAL FIELD

The disclosure relates generally to a display assembly with a diffusing member.

BACKGROUND

Many devices include a liquid crystal display (LCD) screen underneath a cover glass, with the active display screen surrounded by a border. Reflectance differences between the active display screen and its border may impart a mismatched appearance of the display screen and border. Additionally, when the liquid crystal display screen is part of an un-shrouded display system, issues such as veiling glare, diffuse reflection and distracting glare impact readability of the display screen.

SUMMARY

A display unit includes a display region and a border region. The display region is configured to include a dark state. The dark state of the display region may be defined as a powered state of the display unit with a black color setting. The dark state of the display region may be defined as an unpowered state of the display unit. A diffusing member is positioned adjacent to the border region such that the diffusing member is coextensive with the border region. A first electromagnetic ray bundle incident on the display region in the dark state produces a first bidirectional reflection distribution function. A second electromagnetic ray bundle incident on the border region produces a second bidirectional reflection distribution function. The diffusing member is configured such that the first bidirectional reflection distribution function is substantially identical to the second bidirectional reflection distribution function.

The diffusing member may include a base layer and a surface hologram recorded onto the base layer. The surface hologram is configured to encode a spatial pattern in at least one of the opacity, density, and surface height of the base layer. The base layer may be composed of glass with a photopolymer coating. The base layer may be composed of glass with a photographic film coating.

A front surface of the diffusing member is positioned adjacent to the border region. An opaque layer may be positioned adjacent to the back surface of the diffusing member, the opaque layer being configured to absorb light. A touch-sensitive panel may be positioned adjacent to the opaque layer. An image panel may be positioned adjacent to the touch-sensitive panel and configured to display an image. The image panel may include a backlight unit having at least one light-emitting diode (LED) source configured to emit a light. A color conversion layer may be positioned adjacent to and configured to receive the light from the backlight unit. The image panel may include a thin-film-transistor layer, a liquid crystal layer and a color filter layer, each operatively connected to the color conversion layer. The color conversion layer includes a plurality of quantum dots aligned with a transmission axis.

An off-axis limiter having a plurality of aligned features may be positioned at respective fixed intervals and approximately parallel to the transmission axis. The aligned features are configured to absorb an off-axis component of the light. A cover glass may be positioned at the front surface of the diffusing member. An optically-clear lamination material may be inserted between the front surface of the diffusing member and the cover glass. A first anti-reflection layer may be operatively connected to the thin-film-transistor layer. A second anti-reflection layer may be operatively connected to the cover glass. Each of the first and second anti-reflection layers includes a plurality of respective bumps, the respective bumps each having a width less than 400 nanometers and a height that is an order of magnitude greater than the width.

The above features and advantages and other features and advantages of the present invention are readily apparent from the following detailed description of the best modes for carrying out the invention when taken in connection with the accompanying drawings.

DETAILED DESCRIPTION

Figure 1:
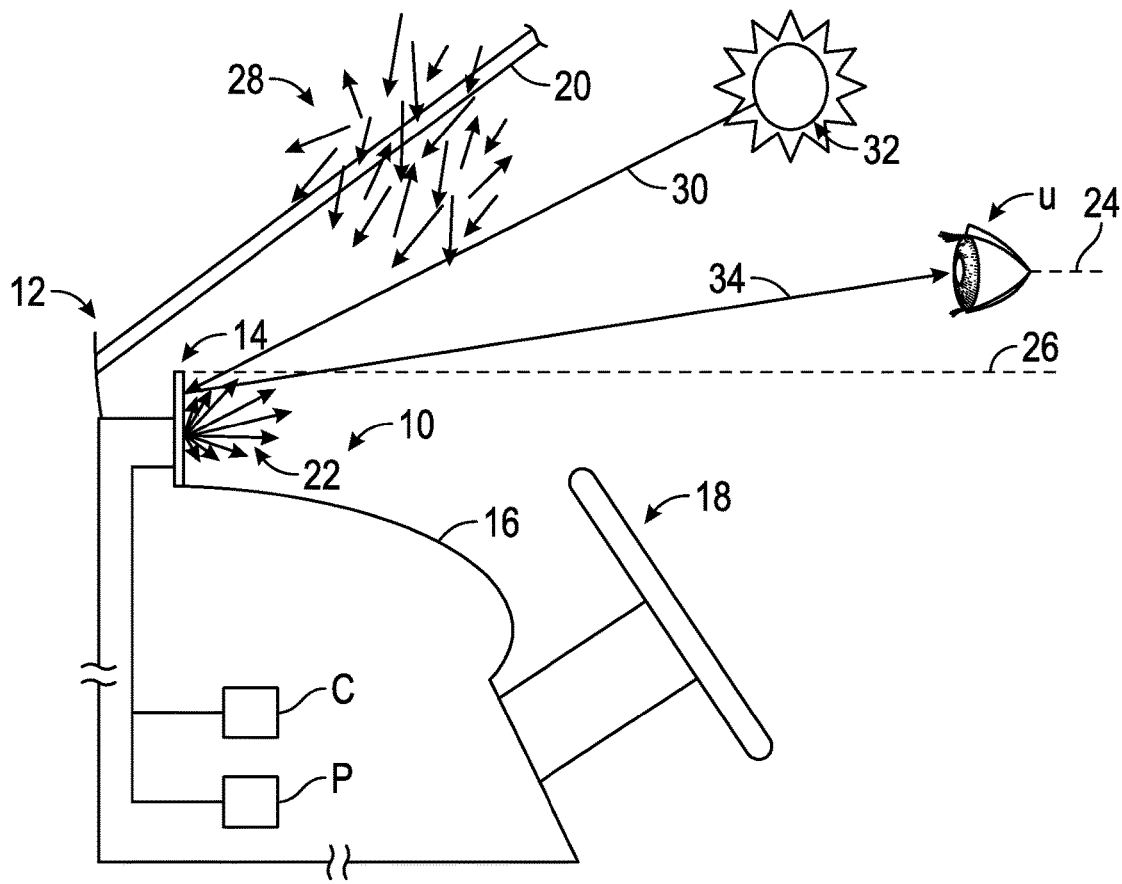
FIG. 1 is a schematic fragmentary side view of a display assembly having a display unit.

Referring to the drawings, wherein like reference numbers refer to like components, FIG. 1 schematically illustrates a display assembly 10 having a display unit 14 configured to display an image. Referring to FIG. 1, the display assembly 10 may be part of a device 12. The device 12 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or any other transportation device. The device 12 may be a non-mobile platform, such as, but not limited to, desktop computers, phones and tablets. The device 12 may take many different forms and include multiple and/or alternate components.

Referring to FIG. 1, the display unit 14 may be operatively connected to a dashboard or instrument panel 16. The display unit 14 displays an image configured to be visible to a user U. In a non-limiting example, the user U may be seated in a driver's seat (not shown) across from a steering wheel 18 of the device 12 or may be seated in a passenger's seat. The assembly 10 may include a controller C for controlling the display unit 14 and a power source P for powering the display unit 14. Any power source P known to those skilled in the art may be employed for powering the display unit 14.

Referring to FIG. 1, the display unit 14 may be positioned in a "head-down" orientation, such that the eye level 24 of the user U is above the top end 26 of the display unit 14. Optimally, the display unit 14 is positioned as high and as forward as allowable. In this orientation, the user U requires a relatively small change in glance angle to shift from the scene outside the windshield 20 to the luminance output 22 of the display unit 14. Far forward displays enable faster re-accommodation of the user U's eye lens focus, enhancing usability. To provide improved readability, the display unit 14 may be configured in an un-shrouded system, i.e. with no side covers or side panels. However, this results in a number of optical issues, including, but not limited to veiling glare, wherein the display luminance impinges on the windshield 20 and is reflected into the user's eye. Also, diffuse reflection from a diffuse ambient source 28 may impinge on the display and be directed into the user's eye, depreciating display contrast. Additionally, incoming rays 30 from the sun 32 may result in a distracting glare, via reflected ray 34.

Figure 2:
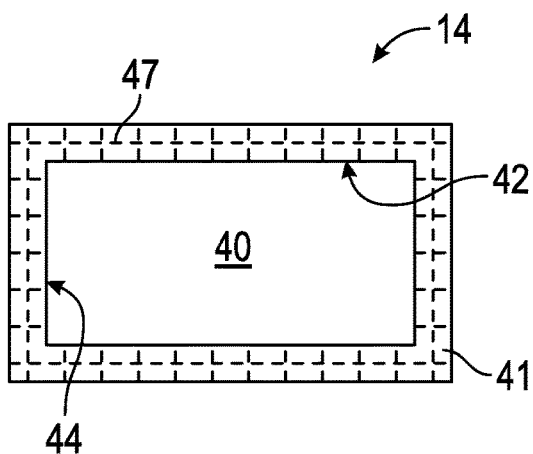
FIG. 2 is a schematic front view of the display unit, showing a display region and a border region.
Figure 3:
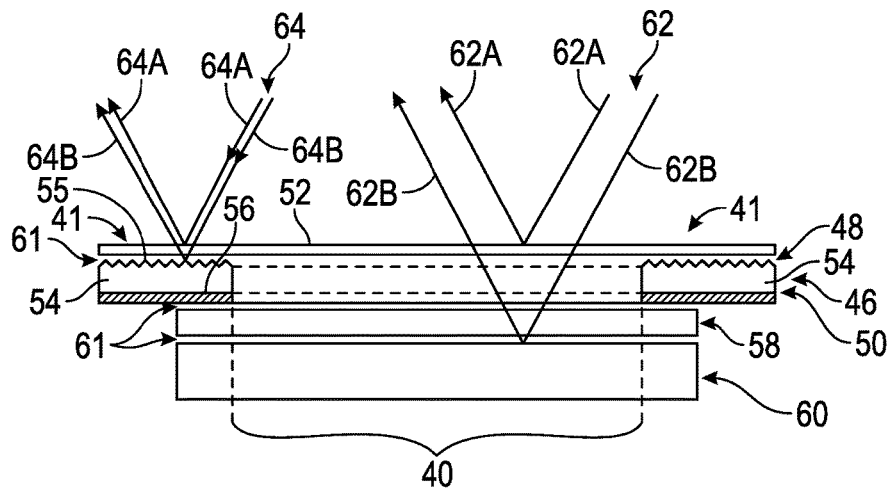
FIG. 3 is a schematic fragmentary sectional view of the display unit of FIG. 1.

FIG. 2 is a schematic front view of the display unit 14 is shown. FIG. 3 is a schematic fragmentary sectional view of the display unit 14. The display unit 14 described herein provides for relatively low diffuse reflectance and relatively low specular reflectance. Referring to FIGS. 2-3, the display unit 14 includes a display region 40 and a border region 41. The display region 40 is configured to display the image whereas the border region 41 does not display the image. In the embodiment shown, the display region 40 and the border region 41 are separated by first and second border lines 42, 44 which are substantially perpendicular to one another. While the display region 40 is shown with a rectangular shape in FIG. 2, it is to be appreciated that the display region 40 and the border region 41 may be formed with any shape. Reflectance differences between the border region 41 and the display region 40 impart a mismatched appearance of the border region 41 relative to the display region 40. The display region 40 is configured to include a dark state. The dark state of the display region 40 may be defined as a powered state of the display unit 14 with a black color setting. Alternatively, the dark state of the display region 40 may be defined as an unpowered state of the display unit 14.

Referring to FIG. 3, a diffusing member 46 is positioned co-extensive with the border region 41. In other words, the diffusing member 46 may be divided into a plurality of portions 47 (shown in phantom in FIG. 2), with each of the plurality of portions 47 being underneath the border region 41. The diffusing member 46 has a front surface 48 and a back surface 50, with the front surface 48 positioned adjacent to a cover glass 52. The diffusing member 46 includes a base layer 54. The base layer 54 may be composed of glass with a photopolymer coating at the front surface 48. The photopolymer coating has structural and reflective properties that can be tailored by radiation exposure processing. The base layer 54 may be composed of glass with a photographic film coating, having light-sensitive silver halide crystals, at the front surface 48. Alternatively, the base layer 54 may include a photopolymer coating on the underside (i.e., at front surface 48 in FIG. 3) of the cover glass 52. Referring to FIG. 3, a surface hologram 55 may be embossed onto the base layer 54 at the front surface 48.

Referring to FIG. 3, the surface hologram 55 is defined as an encoding or recording of an original electromagnetic field as a spatial pattern in at least one of the opacity, density, and surface profile or height of the base layer 54. The spatial pattern may be encoded in a matrix M defined by the opacity (Of), density (D), and surface height (SH) values of the plurality of portions 47. The matrix M may be expressed as:

$M=[O_i, D_i, SH_i]$; where i=1 to n, and there are n plurality of portions 47.

When a second electromagnetic ray bundle is incident on the surface hologram 55, the recorded spatial pattern turns the second electromagnetic ray bundle into a reproduction of the original electromagnetic field. The recording of the surface hologram 55 may be performed using any method known to those skilled in the art. In one example, a mechanical embossing process may be used to produce the surface hologram 55. If the base layer 54 is composed of glass with a photopolymer coating, a laser beam (not shown) may be employed to create the surface hologram 55. If the base layer 54 is composed of glass with a photographic film coating, selective exposure to ultra-violet light may be employed to create the surface hologram 55.

Referring to FIG. 3, an opaque layer 56 is positioned adjacent to the back surface 50 of the diffusing member 46, and is co-extensive with the border region 41. In one embodiment, the opaque layer 56 is embodied as a light-absorbing coating 56 coated on the back surface 50 of the diffusing member 46. A touch-sensitive panel 58 may be positioned adjacent to the opaque layer 56. An image panel 60 is positioned adjacent to the touch-sensitive panel 58 and configured to display an image. The opaque layer 56 blocks the image from being visible through the border region 41. An optically-clear lamination material 61 may be inserted between the touch-sensitive panel 58 and the image panel 60 to increase transmission of light and reduce reflectance variations. The optically-clear lamination material 61 may be applied between the diffusing member 46 and the cover glass 52. An example of an image panel 60 is shown in the exploded view of FIG. 4, described in detail below.

Figure 5A:
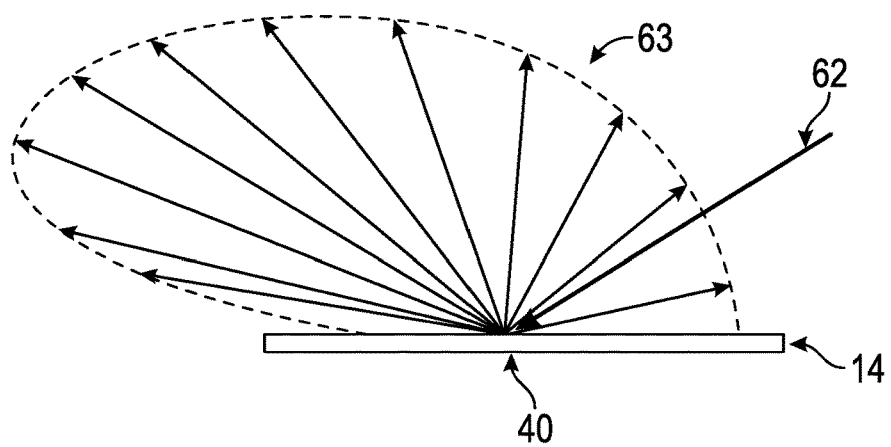
FIG. 5A is a schematic illustration of a first bidirectional reflection distribution function produced by a first electromagnetic ray bundle incident on the display region of FIG. 3.
Figure 5B:
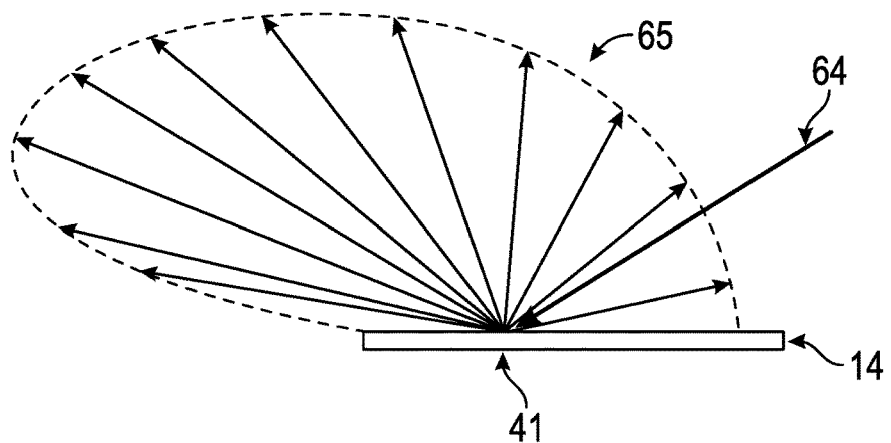
FIG. 5B is a schematic illustration of a second bidirectional reflection distribution function produced by a second electromagnetic ray bundle incident on the border region, with a diffusing member in the display unit.

Referring to FIG. 3, a first electromagnetic ray bundle 62 is shown incident on the display region 40 in the dark state. Different portions of the first electromagnetic ray bundle 62 are reflected off the different surfaces underneath the display region 40. For example, a first portion 62A of the first electromagnetic ray bundle 62 is reflected off the cover glass 52 while a second portion 62B is reflected off the image panel 60. Referring to FIG. 3, a second electromagnetic ray bundle 64 is shown incident on the border region 41. Different portions of the second electromagnetic ray bundle 64 are reflected off the different surfaces underneath the border region 41. For example, a first portion 64A is reflected off the cover glass 52 and a second portion 64B is reflected off the diffusing member 46. Referring to FIG. 5A, the first electromagnetic ray bundle 62 (in its entirety) incident on the display region 40 (in the dark state) produces a first bidirectional reflection distribution function 63. Referring to FIG. 5B, the second electromagnetic ray bundle 64 (in its entirety) incident on the border region 41 produces a second bidirectional reflection distribution function 65.

Figure 5C:
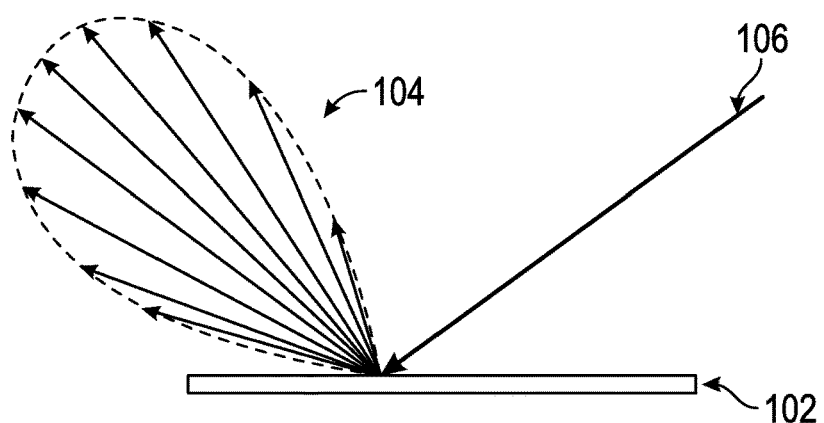
FIG. 5C is a schematic illustration of a third bidirectional reflection distribution function produced by a third electromagnetic ray bundle incident on a border region, with no diffusing member in the display unit.

Referring to FIG. 3, the diffusing member 46 is configured such that the first bidirectional reflection distribution function 63 is substantially identical to the second bidirectional reflection distribution function 65. In other words, the spatial pattern encoded in at least one of the opacity, density and surface height of the surface hologram 55 is selected such that the first bidirectional reflection distribution function 63 is substantially identical to the second bidirectional reflection distribution function 65. For comparison, referring to FIG. 5C, a second display unit 102 is shown, with the diffusing member 46 removed. As shown in FIG. 5C, a third bidirectional reflection distribution function 106 produced by a third electromagnetic ray bundle 104 striking the border region 41 is significantly different from the first bidirectional reflection distribution function 63, in the absence of the diffusing member 46.

Figure 4:
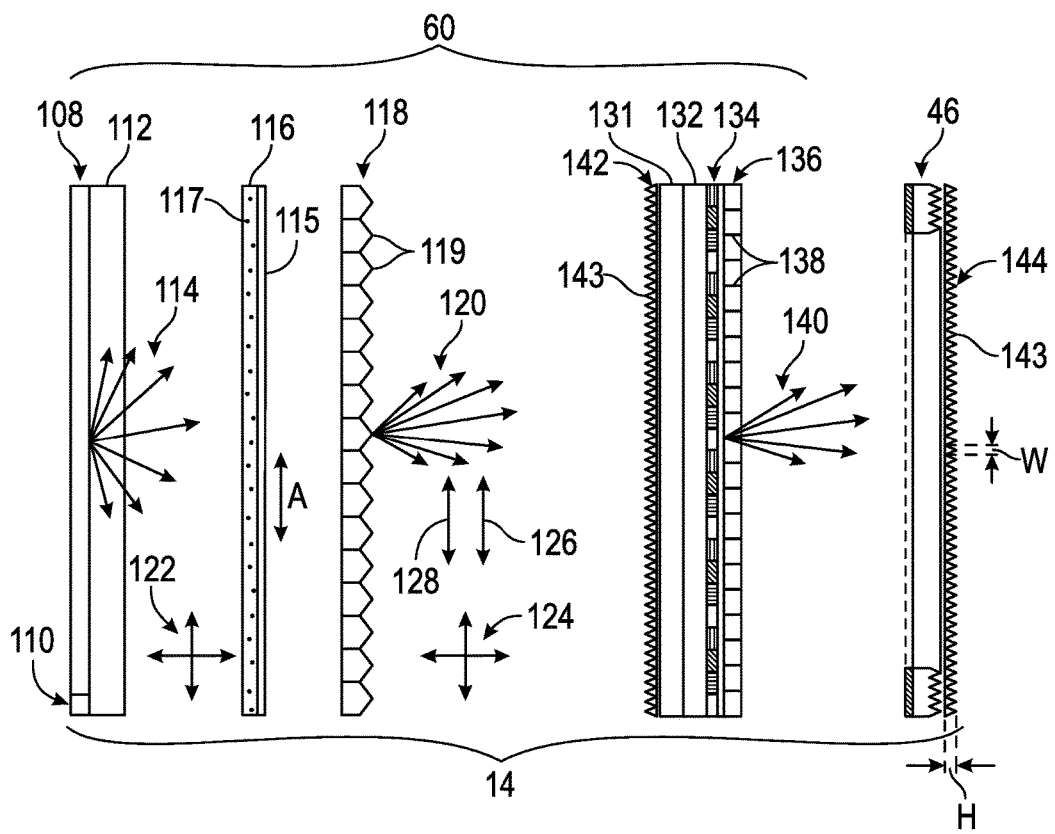
FIG. 4 is a schematic fragmentary exploded view of the display unit of FIG. 1.

Referring now to FIG. 4, an exploded view of an example image panel 60 (see FIG. 3) is shown in detail. The image panel 60 includes a backlight unit 108 having at least one light-emitting diode (LED) source 110 configured to emit light. The light may reflect off another member (not shown) and pass through an optical guide 112, before travelling through the various layers of the display unit 14. Referring to FIG. 4, the backlight unit 108 produces a first luminance distribution 114. As is understood by those skilled in the art, luminance is the luminous intensity projected on a given area and direction. Luminance is an objectively measurable attribute, with a unit of candela per square meter.

Referring to FIG. 4, a color conversion layer 116 is positioned adjacent to and configured to receive the light emitted by the backlight unit 108. In one example, the color conversion layer 116 includes quantum rods 117 having their respective axes aligned with the transmission axis (A) of an LCD input polarizer 115. Quantum dots or other any other color conversion materials known to those skilled in the art may also be employed. As understood by those skilled in the art, quantum rods 117 include tightly confined electrons or electron holes in three dimensions which can be made through colloidal synthesis, plasma synthesis, mechanical fabrication and other processes. The electronic properties of the quantum dots 117 may be tuned as a function of particle size and shape for a given composition. Because the quantum rods 117 are aligned, they will absorb the polarization state that is parallel to their respective axes and will not absorb the polarization state that is perpendicular to their respective axes. The excited quantum rods 117 will emit radiation with a polarization state that is parallel to the rod axis, which is aligned with the transmission axis (A) of the LCD input polarizer 115. In one example, the light-emitting diode (LED) source 110 is configured to emit blue light 122 of all polarization states, with a wavelength of 454 nanometers. The exact LED emission wavelength chosen is on the basis of coupling efficiency to the color conversion layer 116. In this case, after passing through the color conversion layer 116, the transmitted red light 126 and the transmitted green light 128 are polarized parallel to the transmission axis (A) of the LCD input polarizer 115 and the transmitted blue light 124 is of both polarization states.

Referring to FIG. 3, the image panel 60 may include a lenticular prismatic array 118 having a plurality of lenses 119 configured to narrow the luminance distribution of the light by redirection off axis light to the direction normal too the display surface, resulting in a second luminance distribution 120 that is narrower than the first luminance distribution 114. In the embodiment shown, the lenses 119 are composed of plastic.

Referring to FIG. 4, the image panel 60 includes a thin-film-transistor layer 131, a liquid crystal layer 132 and a color filter layer 134, positioned adjacent to the lenticular prismatic array 118. Referring to FIG. 4, an off-axis limiter 136 may be positioned adjacent to the color filter layer 134. The off-axis limiter 136 includes a plurality of aligned optically absorbing features 138 positioned at respective fixed intervals and approximately perpendicular to the display normal. The aligned absorbing features 138 are configured to absorb an off-axis component of any incident radiation, resulting in a third luminance distribution 140 that is narrower than the second luminance distribution 120.

Referring to FIG. 3, the image panel 60 may include a first anti-reflection layer 142 positioned adjacent to the thin-film-transistor layer 131. A second anti-reflection layer 144 may be positioned adjacent to the front surface 48 of the diffusing member 46. The first and second anti-reflection layers 142, 144 each have a plurality of respective apexes 143. Each respective apex 143 has a width (W) less than a wavelength of visible light, and a height (H) that is about an order of magnitude greater than the width (W). In one example, the width (W) of the apex 143 is less than 400 nanometers.

In summary, a variety of elements may be integrated to produce a high-performance display assembly 10 with appearance matching features for the border region 41 and display region 40, with relatively low reflectance, shaped luminance distribution and high color gamut. These features improve high-ambient contrast performance to enable implementation of un-shrouded head-down displays.

The controller C of the assembly 10 includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A display assembly comprising:
   a display unit having a display region and a border region, the display region configured to include a dark state;
   a diffusing member positioned adjacent to the border region such that the diffusing member is coextensive with the border region;
   wherein the diffusing member includes a front surface and a back surface, the front surface of the diffusing member being positioned adjacent to the border region;
   an opaque layer positioned adjacent to the back surface of the diffusing member, the opaque layer being configured to absorb light;
   a touch-sensitive panel positioned adjacent to the opaque layer;
   an image panel positioned adjacent to the touch-sensitive panel and configured to display an image, the image panel including:
      a backlight unit having at least one light-emitting diode (LED) source configured to emit a light;
      a color conversion layer positioned adjacent to and configured to receive the light from the backlight unit, the color conversion layer including a plurality of quantum rods aligned with a transmission axis of an LCD input polarizer; and
      a thin-film-transistor layer, a liquid crystal layer and a color filter layer, each operatively connected to the color conversion layer;
   wherein the display region is configured such that a first electromagnetic ray bundle incident on the display region in the dark state produces a first bidirectional reflection distribution function;
   wherein the border region is configured such that a second electromagnetic ray bundle incident on the border region produces a second bidirectional reflection distribution function; and
   wherein the diffusing member is configured such that the first bidirectional reflection distribution function is substantially identical to the second bidirectional reflection distribution function.

2. The assembly of claim 1, wherein the diffusing member includes:
   a base layer; and
   a surface hologram recorded onto the base layer, the surface hologram being configured to encode a spatial pattern in at least one of the opacity, density, and surface height of the base layer.

3. The assembly of claim 2, wherein the base layer is composed of glass with a photopolymer coating.

4. The assembly of claim 1, wherein the dark state of the display region is defined as a powered state of the display unit with a black color setting.

5. The assembly of claim 1, further comprising:
   an off-axis limiter having a plurality of aligned features positioned at respective fixed intervals and approximately parallel to the transmission axis; and
   wherein the aligned features are configured to absorb an off-axis component of the light.

6. The assembly of claim 1, further comprising:
   a cover glass positioned at the front surface of the diffusing member; and
   an optically-clear lamination material inserted between the front surface of the diffusing member and the cover glass.

7. The assembly of claim 6, further comprising:
   a first anti-reflection layer operatively connected to the thin-film-transistor layer;
   a second anti-reflection layer operatively connected to the cover glass; and
   wherein each of the first and second anti-reflection layers includes a plurality of respective apexes, each of the plurality of respective apexes having a width less than 400 nanometers and a height that is an order of magnitude greater than the width.

8. The assembly of claim 1, wherein the image panel includes:
   a lenticular prismatic array having a plurality of lenses configured to narrow a luminance distribution of the light along a transmission axis.

9. A display assembly comprising:
   a display unit having a top end and configured to be visible to a user located at a user eye level;
   wherein the display unit is configured in a head-down orientation such that the user eye level is above the top end of the display unit;
   wherein the display unit has a display region and a border region, the display region being configured to include a dark state;
   a diffusing member positioned adjacent to the border region such that the diffusing member is coextensive with the border region;
   wherein the diffusing member includes a front surface and a back surface, the front surface of the diffusing member being positioned adjacent to the border region;
   an opaque layer positioned adjacent to the back surface of the diffusing member, the opaque layer being configured to absorb light;
   a touch-sensitive panel positioned adjacent to the opaque layer;
   an image panel positioned adjacent to the touch-sensitive panel and configured to display an image, the image panel including:
      a backlight unit having at least one light-emitting diode (LED) source configured to emit a light;
      a color conversion layer positioned adjacent to and configured to receive the light from the backlight unit, the color conversion layer including a plurality of quantum rods aligned with a transmission axis of an LCD input polarizer; and
      a thin-film-transistor layer, a liquid crystal layer and a color filter layer, each operatively connected to the color conversion layer;
   wherein the display region is configured such that a first electromagnetic ray bundle incident on the display region in the dark state produces a first bidirectional reflection distribution function;
   wherein the border region is configured such that a second electromagnetic ray bundle incident on the border region produces a second bidirectional reflection distribution function; and
   wherein the diffusing member is configured such that the first bidirectional reflection distribution function is substantially identical to the second bidirectional reflection distribution function.

10. The assembly of claim 9, wherein the dark state of the display region is defined as a powered state of the display unit with a black color setting.

11. The assembly of claim 9, wherein the dark state of the display region is defined as an unpowered state of the display unit.

12. The assembly of claim 9, wherein the diffusing member includes:
a base layer; and
a surface hologram recorded onto the base layer, the surface hologram being configured to encode a spatial pattern in at least one of the opacity, density, and surface height of the base layer.

13. The assembly of claim 12, further comprising:
a cover glass positioned at the front surface of the diffusing member; and
wherein the base layer includes a photopolymer coating on the cover glass.

14. The assembly of claim 9, further comprising:
an off-axis limiter having a plurality of aligned features positioned at respective fixed intervals and approximately parallel to the transmission axis; and
wherein the aligned features are configured to absorb an off-axis component of the light;
a cover glass positioned at the front surface of the diffusing member;
an optically-clear lamination material inserted between the front surface of the diffusing member and the cover glass;
a first anti-reflection layer operatively connected to the thin-film-transistor layer;
a second anti-reflection layer operatively connected to the cover glass; and
wherein each of the first and second anti-reflection layers includes a plurality of respective apexes, the plurality of respective apexes each having a width less than 400 nanometers and a height that is an order of magnitude greater than the width.

15. A display assembly comprising:
a display unit having a display region and a border region, the display region configured to include a dark state;
a diffusing member positioned adjacent to the border region such that the diffusing member is coextensive with the border region;
wherein the diffusing member includes a front surface and a back surface, the front surface of the diffusing member being positioned adjacent to the border region;
an opaque layer positioned adjacent to the back surface of the diffusing member, the opaque layer being configured to absorb light;
a touch-sensitive panel positioned adjacent to the opaque layer;
an image panel positioned adjacent to the touch-sensitive panel and configured to display an image, the image panel including a thin-film-transistor layer;
a cover glass positioned at the front surface of the diffusing member;
an optically-clear lamination material inserted between the front surface of the diffusing member and the cover glass;
a first anti-reflection layer operatively connected to the thin-film-transistor layer;
a second anti-reflection layer operatively connected to the cover glass;
wherein each of the first and second anti-reflection layers includes a plurality of respective apexes, each of the plurality of respective apexes having a width less than 400 nanometers and a height that is an order of magnitude greater than the width;
wherein the display region is configured such that a first electromagnetic ray bundle incident on the display region in the dark state produces a first bidirectional reflection distribution function;
wherein the border region is configured such that a second electromagnetic ray bundle incident on the border region produces a second bidirectional reflection distribution function; and
wherein the diffusing member is configured such that the first bidirectional reflection distribution function is substantially identical to the second bidirectional reflection distribution function.

* * * * *